May 7, 1935.   J. C. LINCOLN   2,000,182
METHOD OF MAKING WELDING ROD OR FLUX HOLDER
Original Filed Jan. 29, 1920
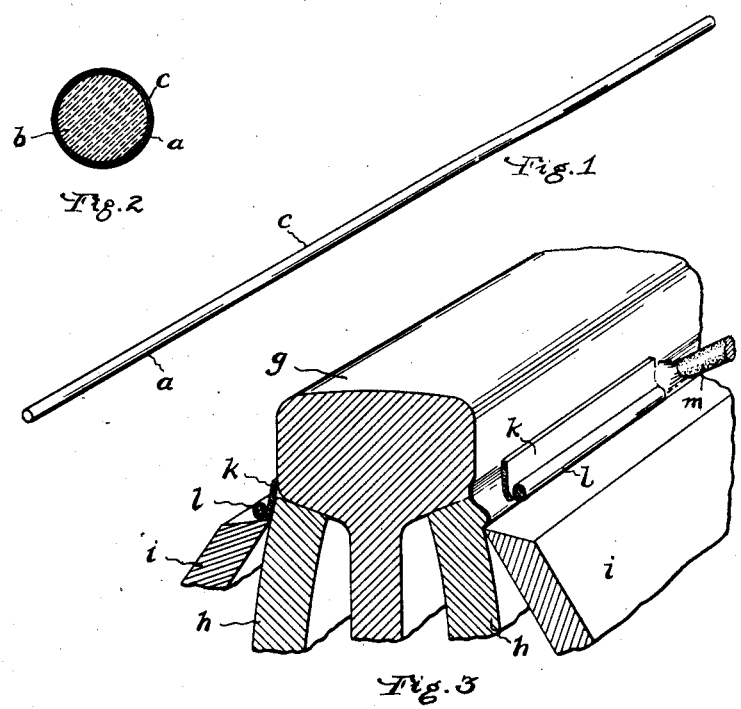
INVENTOR
ATTORNEY Patented May 7, 1935

2,000,182

UNITED STATES PATENT OFFICE 2,000,182

METHOD OF MAKING WELDING ROD OR FLUX HOLDER

John C. Lincoln, Cleveland, Ohio, assignor to the Union Trust Company, Cleveland, Ohio Original application January 29, 1920, Serial No. 354,950, now Patent No. 1,722,929, dated July 30, 1929. Divided and this application December 15, 1928, Serial No. 326,309

7 Claims. (Cl. 219—8)

This invention relates to the production of a rod or holder capable of carrying a suitable flux adapted for welding operations, the object of my invention being to provide a rod or holder associated with fluxing material of known quantity and which will adequately protect the weld metal.

This application is a division of my copending application for "Flux holder", Serial No. 354,950, filed January 29, 1920 which has matured into Patent No. 1,722,929, dated July 30, 1929.

In welding operations, particularly in the open air, there is always a tendency to displace the ordinary flux, which usually is applied in powdered form, while it requires unusual care and some experience, properly to distribute such powdered flux along the line of the weld. Thus, the welding flame or arc, supplemented by external drafts, constantly tends to displace and blow away any powdered flux previously applied to the line of welding. As a result, the molten metal is not adequately or evenly protected, and the resulting weld frequently is of unsatisfactory and undependable character.

Accordingly, I have solved the difficulties ordinarily encountered in applying a flux for welding, by providing a suitable, semi-permanent holder which is supplied with a definite charge of solid fluxing material and preferably coated with a protective covering. As a principal ingredient, I may compound the fluxing material with sodium carbonate or I may use it alone; the desired quality thereof being its marked tendency to spread and cover the metal of the weld when in molten condition. I may combine therewith other suitable materials, such as calcium carbonate or resin, which are dissipated by the welding flame to produce an inert atmosphere about said flame and molten metal, whereby further to protect the weld and avoid a brittle structure otherwise likely to result.

My invention may best be described in connection with the accompanying drawing, wherein:

Fig. 1 is a plan view of a tubular welding rod or flux holder embodying said invention.

Fig. 2 is an enlarged cross-sectional view of the foregoing.

Fig. 3 is a fragmentary cross-sectional view of a railway rail and fish plates which are in process of being electrically welded with the aid of my flux holder.

Fig. 4 is a longitudinal sectional view, and Figs. 5, 6 and 7 are transverse sectional views on corresponding lines; all somewhat diagrammatic in character, illustrating one means for making a tubular flux holder.

Throughout the several figures of the drawing I have employed the same character of reference to indicate similar parts.

Essentially the new article of manufacture contemplated by the method covered by this application comprises a holder or container carrying a definite charge of fluxing material, of which a large proportion preferably possesses the quality of high capillarity. The flux is in solid form so that it may not be displaced by the drafts and gases attendant upon the use of a welding flame. As thus far employed, the charge has been applied either interiorly or exteriorly of a metallic holder, and it has been protected by a suitable covering, as of resin.

The holder of Figs. 1 and 2 comprises a tube of thin sheet metal $a$ which is interiorly packed with a solid fluxing material $b$ and the whole is coated with a protective covering $c$ to avoid any deterioration or action of the air thereon. Thus, sodium carbonate above mentioned, is subject to slow deliquescence, as are other fluxing agents, and this is counteracted by a thin covering $c$ of resin, applied by dipping the treated holder in a substantially saturated mixture of wood alcohol and resin.

This tubular rod or holder may be manufactured in the manner illustrated in Figs. 4 to 7, wherein a thin, flat strip $a'$ is passed intermittently in turn through a die-block $d$ imparting thereto a U-shape; through a packer $e$ and finally through a die-block $f$ which completes the tube. The packer $e$ has a hopper portion $e'$ filled with the fluxing material or mixture, and a ram $e''$ serves intermittently to depress the material within the hopper so as to fill the U-shaped casing with the flux, as indicated in Fig. 6.

The sodium carbonate desirably may be combined or mixed with other materials, as with borax, fine sand, calcium carbonate, resin or other suitable hydrocarbon. These latter suffer disintegration at a low heat and serve to generate an inert, protective atmosphere about the welding flame and the molten metal. One simple mixture which I have found advantageous in rail welding comprises two parts of sodium carbonate, one part of resin and one part wood alcohol; the resin acting both as a protector and binder for the carbonate.

The holder, although preferably of metal such, for example, as steel, may be a roll or tube of other material than metal, such as fiber or compressed paper, for example. Its office is that of retaining, protecting and positioning the fluxing material until it is subjected in position to the welding flame. The metal, in part, is vaporized as is any other semi-permanent holder, although some of the metal is certain to become a part of the weld itself, if a steel or alloyed wire is used. Indeed, the metal container or holder, which ordinarily is preferable, affords a ready means for introducing a definite amount of welding or alloying material to the welded seam.

For the purpose of explaining the use of my improved flux holder, I have illustrated in Fig. 3 the process of electrically welding rail ends between their embracing fish plates. The rail $g$ has terminally engaging fish plates $h$; the upper right hand edges being in process of welding. A copper bar $i$ is positioned along the line of the proposed weld, but beneath it, while a strip of metal $k$ and a flux holder $l$ of the type already described are disposed immediately adjacent to the line of welding. Preferably, the negative carbon electrode $m$ is employed to advance an electric arc along the line of the proposed weld, which rapidly melts the adjacent surfaces of the rail and fish plate, the metal $k$ and the flux holder within its welding flame. The flux, due to its high capillarity, spreads in molden condition over the surface of the melted metal and protects it from atmospheric action. This is observable, much as oil will spread over a surface of water, even though the parts are practically in vertical position, as instanced.

It will be readily understood that the semi-permanent tube or holder serves to retain the flux in desired quantities properly positioned with respect to the arc and welded seam, until the holder is melted or consumed. Thus, the flux is not liable to dissipation or loss, as where a powdered material is relied upon.

What I claim is:

1. The herein described method of manufacturing a welding rod which consists in progressively forming a flat strip of sheet metal to substantially U-shape, progressively packing the U-shaped portion tightly with powdered fluxing material and progressively bending the edges of the strip inwardly over the tightly packed fluxing material to form a tube enclosing said fluxing material.

2. The method of making a welding rod which comprises bending a flat strip of relatively thin sheet metal to substantially U shape, supporting a length of said U-shaped sheet metal along the entire exterior thereof, introducing fluxing material into the interior of said U-shaped length and applying pressure on said fluxing material to compact the same within said U-shaped length, and subsequently bending said U-shaped length to tubular form enclosing said compacted fluxing material, whereby fluxing material may be compacted into the sheet metal shell without distortion of said sheet metal.

3. The method of making a welding rod which comprises forming a metal strip into substantially U shape, disposing deliquescent fluxing material within the U-shaped receptacle, compacting said fluxing material, further shaping said sheet metal to tubular form, and applying resinous protective material to the completed article to prevent deliquescence of the fluxing material.

4. The method of manufacturing a welding rod, which comprises drawing a flat strip of sheet metal to bend the strip to a substantially U-shape, feeding flux material by pressure into the U-shaped portion, and then further drawing the U-shaped strip to bend it into a substantially tubular form.

5. The process of forming a flux container for welding purposes, which comprises drawing a substantially U-shaped container through a mass of powdered fluxing material, pressing the powdered material into the U-shaped portion during its passage through the flux, and then bending over the side walls to confine the flux material therein.

6. A continuous process of producing welding rods, which comprises passing a flat strip through a die to form a substantially U-shaped container, drawing the container thus formed through a mass of flux materials, intermittently pressing the flux material into the U-shaped container during its passage through the flux, and finally bending over the edges of the U-shaped container to confine the flux within the container.

7. A continuous process of producing welding rods, which comprises passing a U-shaped container through a mass of flux, intermittently pressing the flux material into the U-shaped container during its passage through the flux, and then bending over the sides of the U-shaped container to confine the flux material therein.

JOHN C. LINCOLN.